US009489399B1

(12) United States Patent
Laporte et al.

(10) Patent No.: US 9,489,399 B1
(45) Date of Patent: Nov. 8, 2016

(54) DATA CENTER MANAGEMENT USING VIRTUALIZED DATA CENTER INVENTORY

(71) Applicant: EMC Corporation, Hopkinton, MA (US)

(72) Inventors: Russell Laporte, Webster, MA (US); Daniel Collins, Princeton, MA (US); Ankita Pawar, Raleigh, NC (US); Jun Liang, Worcester, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/720,473

(22) Filed: Dec. 19, 2012

(51) Int. Cl.
*G06F 17/30* (2006.01)

(52) U.S. Cl.
CPC ... *G06F 17/30241* (2013.01); *G06F 17/30286* (2013.01)

(58) Field of Classification Search
CPC ............. G06F 17/30; G06F 17/30002; G06F 17/30286
USPC ........................................................ 235/375
See application file for complete search history.

(56) References Cited

U.S. PATENT DOCUMENTS

| | | | |
|---|---|---|---|
| 5,726,435 A * | 3/1998 | Hara et al. | 235/494 |
| 8,171,142 B2 | 5/2012 | Kolin et al. | |
| 2011/0218730 A1 | 9/2011 | Rider et al. | |
| 2011/0241833 A1 | 10/2011 | Martin et al. | |
| 2013/0186956 A1 * | 7/2013 | Ashok et al. | 235/385 |

OTHER PUBLICATIONS

Deffeyes and Katz, "Augmented Reality in the data center," Academy TechNotes, 2010, (1 page), ATN vol. 1 No. 2, IBM Academy of Technology.
Deffeyes, "Mobile augmented reality in the data center," IBM J. Res & Dev., Sep./Oct. 2011, (5 pages), vol. 55 No. 5 Paper 5.
Kan and Teng, "A Framework for Multifunctional Augmented Reality Based on 2D Barcodes," SIGGRAPH 2010, (1 page).

* cited by examiner

*Primary Examiner* — Toan Ly
(74) *Attorney, Agent, or Firm* — Proskauer Rose LLP

(57) ABSTRACT

Described are methods, systems, and apparatus, including computer program products for locating a target IT component in a data center. A first identification marker is scanned by a mobile computing device. A location of the first identification marker in the data center based on a virtual representation of the data center is determined by the mobile computing device. An identity of the target IT component is received. A location of the rack containing the target IT component in the data center based on the virtual representation of the data center is determined by the mobile computing device. A map of the data center, wherein the map of the data center includes first indicia of the location of the first identification marker and second indicia of the location of the rack containing the target IT component, is displayed by the mobile computing device.

17 Claims, 8 Drawing Sheets

DATA CENTER MANAGEMENT USING VIRTUALIZED DATA CENTER INVENTORY

TECHNICAL FIELD

The present technology relates generally to data center management and, more specifically, to locating IT components in a data center using a virtual representation of the data center.

BACKGROUND

In some implementations, a data center can provide computer processing and/or storage resources. A data center can support performing one or more prescribed processing tasks. In some common applications, for example, a data center can be used to implement any kind of network-accessible service (such as an Email service, search service, etc.). In some common applications, a data center can be used to implement storage, backup, and/or archival functionality.

A data center can include various physical resources to support and provide, e.g., computer processing and/or storage. A data center can include IT components, such as racks, servers, data storage devices, disk drives, networking equipment, and uninterruptible power supplies (UPSs). Data centers can include supporting resources, such as HVAC units, chillers, cooling equipment, generators, and battery backup systems. In some cases, the physical resources of a data center can be housed in an enclosure, such as a room or building. For a large-scale service, a data center can require a large number of physical resources occupying one or more buildings.

There have been recent developments in mobile computing devices such as laptops, smart phones, and tablets. In particular, mobile computing devices can provide a variety of functions such as a digital camera capable of functioning as an optical code scanner. Mobile computing devices can provide accelerometers, GPS receivers, and other sensors.

Optical code scanners can be used in applications that rely on optical codes, such as bar codes, Quick Response (QR) codes, or other matrix codes, to store information. Industries such as retail, airline, self service, automotive, parcel delivery, pharmaceutical and healthcare use optical codes to provide inventory control, customer identification, item tracking and many other functions. Optical code scanners scan or read an optical code that is typically attached to or printed on an object. A typical optical code is comprised of a number of bars or modules. Information is encoded in an optical code by the arrangement of bars or modules. When an optical code is placed within the field of view of a scanner, the scanner can read the bars or modules comprising the optical code and then use this data to decode the information encoded in the optical code. This operation is called decoding an optical code. The information produced by decoding an optical code can take the form of an alphanumeric string, numeric string, or binary string.

SUMMARY

As the number of the IT components in data centers increase, the management of the data centers becomes increasingly complex. Accordingly, there is a need to simplify the management of data centers. As described herein, virtual representations of data centers can be used to locate IT components, thereby facilitating management.

In one aspect, there is a method executed on a mobile computing device for locating a target IT component in a data center. The method can include scanning, by the mobile computing device, a first identification marker. The method can include determining, by the mobile computing device, a location of the first identification marker in the data center based on a virtual representation of the data center. The method can include receiving, by the mobile computing device, an identity of the target IT component. The method can include determining, by the mobile computing device, an identity of a rack containing the target IT component based on a virtual representation of the data center. The method can include determining, by the mobile computing device, a location of the rack containing the target IT component in the data center based on the virtual representation of the data center. The method can include displaying, by the mobile computing device, a map of the data center, wherein the map of the data center includes first indicia of the location of the first identification marker and second indicia of the location of the rack containing the target IT component. The method can include scanning, by the mobile computing device, a second identification marker. The method can include determining, by the mobile computing device, whether the second identification marker is associated with the target IT component or the rack containing the target IT component.

In some embodiments, the method can include, if the second identification marker is associated with the target IT component, displaying third indicia representing that the target IT component is located.

In some embodiments, the method can include, if the second identification marker is associated with the rack containing the target IT component: displaying, by the mobile computing device, a representation of the rack containing the target IT component; scanning, by the mobile computing device, a third identification marker; and, if the third identification marker is associated with the target IT component, displaying, by the mobile computing device, third indicia representing that the target IT component is located.

In some embodiments, the method can include tracking, by the mobile computing device, a location of the mobile computing device in the data center and displaying, by the mobile computing device, the first indicia at the location of the mobile computing device.

In another aspect, there is a computer program product, tangibly embodied in a non-transitory computer readable storage medium, including instructions being operable to cause a mobile computing device to scan a first identification marker; determine a location of the first identification marker in the data center based on a virtual representation of the data center; receive an identity of the target IT component; determine an identity of a rack containing the target IT component based on a virtual representation of the data center; determine a location of the rack containing the target IT component in the data center based on the virtual representation of the data center; display a map of the data center, wherein the map of the data center includes first indicia of the location of the first identification marker and second indicia of the location of the rack containing the target IT component; scan a second identification marker; and determine whether the second identification marker is associated with the target IT component or the rack containing the target IT component.

In some embodiments, the computer program product includes instructions being operable to cause a mobile computing device to, if the second identification marker is associated with the target IT component, display third indicia representing that the target IT component is located.

In some embodiments, the computer program product includes instructions being operable to cause a mobile computing device to, if the second identification marker is associated with the rack containing the target IT component: display a representation of the rack containing the target IT component; scan a third identification marker; and, if the third identification marker is associated with the target IT component, display third indicia representing that the target IT component is located.

In some embodiments, the computer program product includes instructions being operable to cause a mobile computing device to track a location of the mobile computing device in the data center and display the first indicia at the location of the mobile computing device.

In another aspect, there is a mobile computing device. The mobile computing device can include a scanner and a display. The mobile computing device can include a data center management module configured to: scan a first identification marker; determine a location of the first identification marker in the data center based on a virtual representation of the data center; receive an identity of the target IT component; determine an identity of a rack containing the target IT component based on a virtual representation of the data center; determine a location of the rack containing the target IT component in the data center based on the virtual representation of the data center; display, on the display, a map of the data center, wherein the map of the data center includes first indicia of the location of the first identification marker and second indicia of the location of the rack containing the target IT component; scan a second identification marker; and determine whether the second identification marker is associated with the target IT component or the rack containing the target IT component.

In some embodiments, the data center management module can be configured to, if the second identification marker is associated with the target IT component, display, on the display, third indicia representing the target IT component is located.

In some embodiments, the data center management module can be configured to, if the second identification marker is associated with the rack containing the target IT component display, on the display, a representation of the rack containing the target IT component; scan a third identification marker; and, if the third identification marker is associated with the target IT component, display third indicia representing the target IT component is located.

In some embodiments, the data center management module can be configured to track a location of the mobile computing device in the data center and display, on the display, the first indicia at the location of the mobile computing device.

In some embodiments, the third indicia representing that the target IT component is located comprises a representation of the target IT component in the rack containing the target IT component. In some embodiments, the target IT component is a server. In some embodiments, the first identification marker and the second identification marker are QR codes. In some embodiments, the second indicia of the location of the rack containing the target IT component comprises a representation of the rack containing the target IT component.

BRIEF DESCRIPTION OF THE DRAWINGS

The foregoing and other objects, features, and advantages of the technology, as well as the technology itself, will be more fully understood from the following description of various embodiments, when read together with the accompanying drawings, in which.

DETAILED DESCRIPTION

Described herein is technology for managing data centers. The technology can be used to locate IT components in a data center using a virtual representation of a data center. The virtual representation of the data center, or virtual data center, can be a computer-based model of the real-world data center. The virtual representation of the data center can include data that describes aspects of the data center. The virtual representation of the data center can include a representation of the building or room housing the data center. For example, the position of walls, floors, ceilings, doors, and other structural aspects in the data center can be included in the virtual representation of the data center. The virtual representation of the data center can include representations of IT components that are in the data center. For example, the position of racks, servers, data storage devices, disk drives, networking equipment, UPSs, HVAC units, chillers, cooling equipment, generators, and battery backup systems can be included in the virtual representation of the data center. Beneficially, a virtual representation of a data center can facilitate the management of the data center. For example, the IT components within the data center, and the location of those IT components within the data center, can be determined from the virtual representation of the data center. As another example, the cabling or re-cabling of IT components within the data center can be planned using the virtual representation of the data center.

The technology can involve a mobile computing device using a virtual representation of a data center to locate IT components in the data center. The mobile computing device can receive the identity of a target IT component to locate in the data center. The mobile computing device can determine the current location of the mobile computing device within the data center. The mobile computing device can display a map of the data center showing the location of the target IT component and the location of the mobile computing device to facilitate locating the target IT component. In some embodiments, the mobile computing device can track its current location and display its current location on the map of the data center. In some embodiments, the mobile computing device can facilitate locating a target IT component in a rack (e.g., facilitate finding the rack within the data center that contains the target IT component and finding the target IT component within the rack).

Figure 1A:
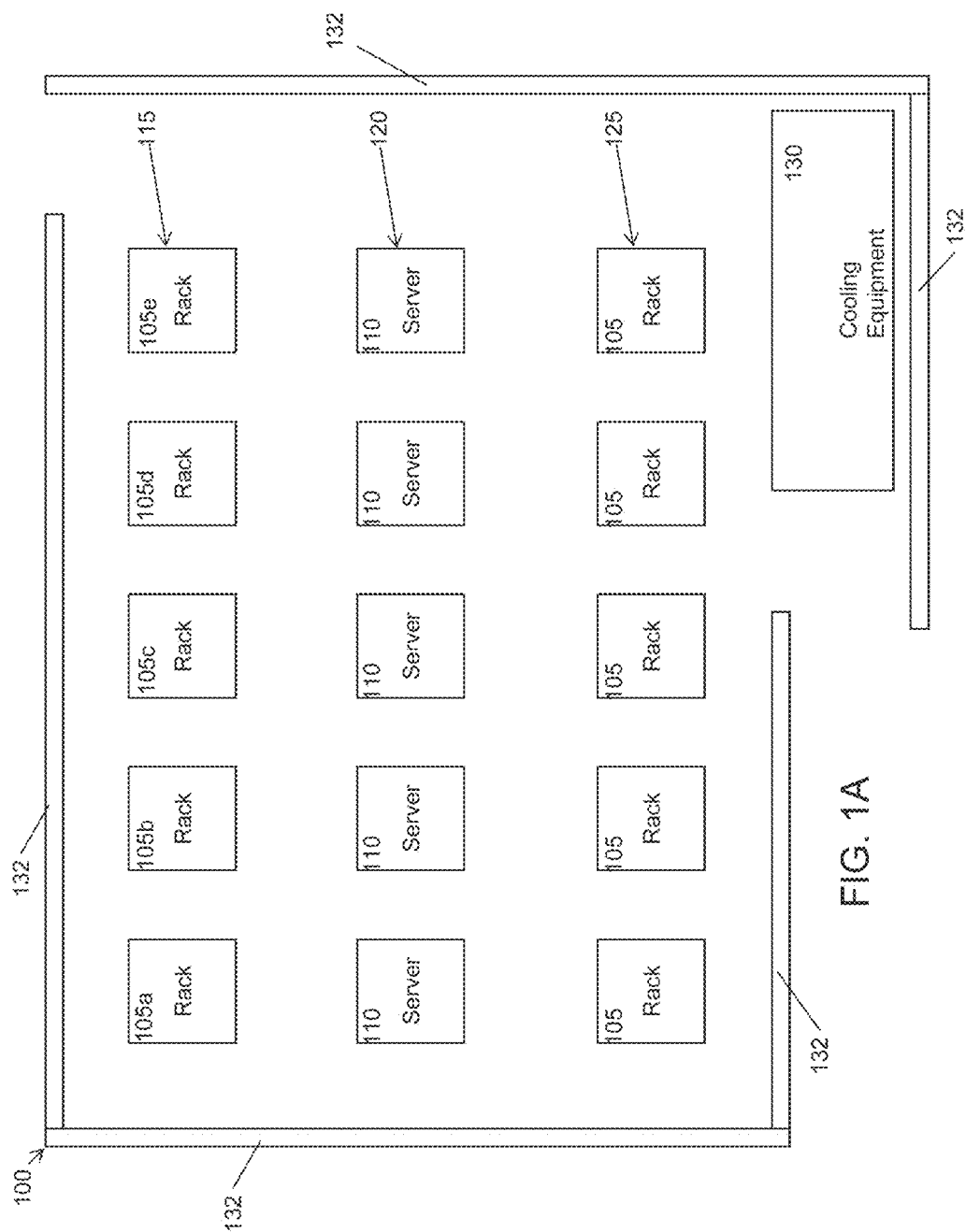
FIG. 1A depicts an exemplary data center.

FIG. 1A depicts exemplary data center 100. Data center 100 includes various IT components, such as racks 105 and servers 110. As illustrated, multiple racks 105 are positioned in row 115, multiple servers 110 are positioned in row 120, and multiple racks 105 are positioned in row 125. Additionally, data center 100 contains cooling equipment 130. Racks 105 can house other IT components, such as servers, data storage devices, networking equipment, and UPSs. Servers 110 can be any kind of computing device. Data center 100 includes walls 132.

As described in greater detail below, the technology can involve utilizing a virtual representation of a data center, such as data center 100. For example, the technology can utilize a virtual representation of data center 100 that includes the positions of racks 105, servers 110, cooling equipment 130, and walls 132.

Figure 1B:
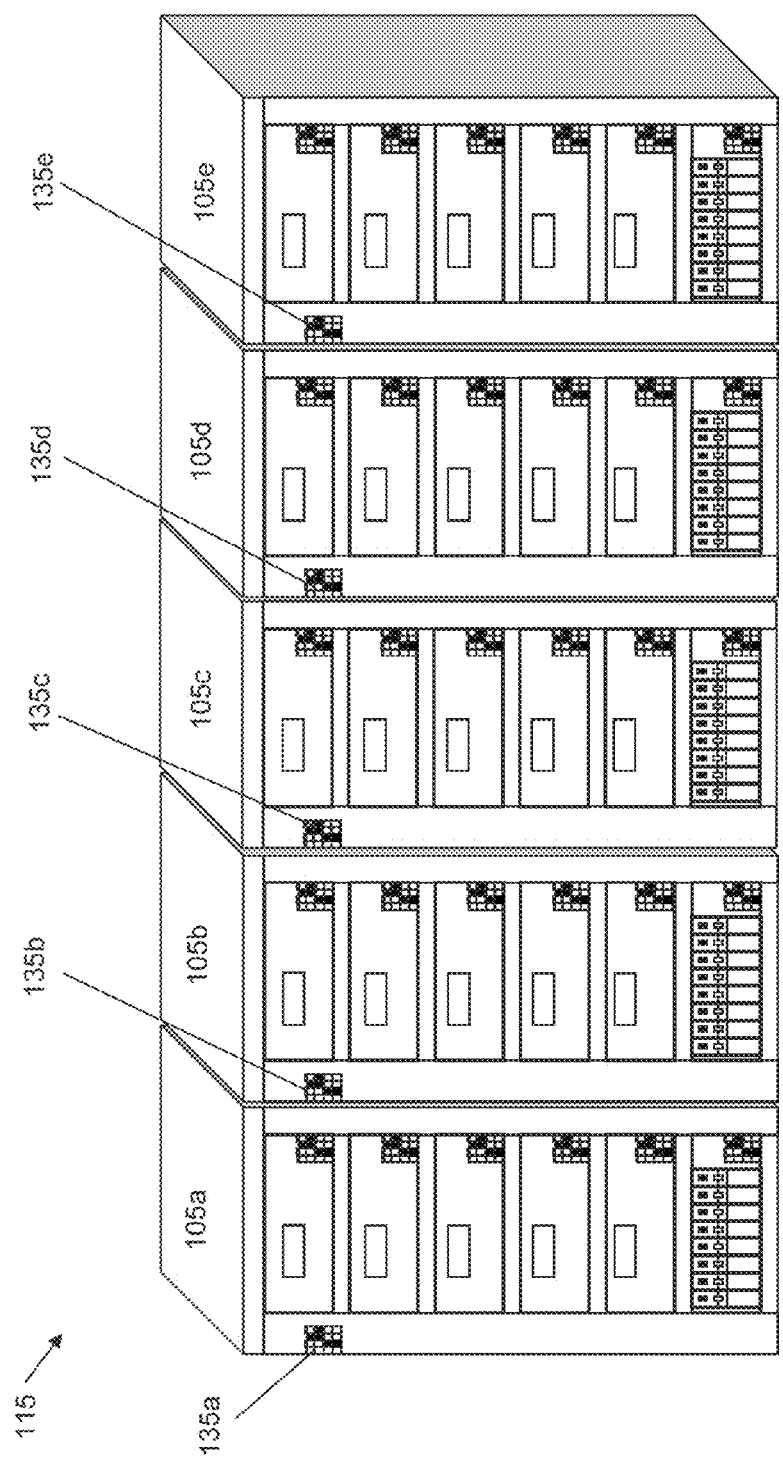
FIG. 1B depicts a row of racks in a data center.

FIG. 1B depicts row 115 of racks 105a-105e (generally racks 105) in data center 100. As illustrated in FIG. 1B, racks 105 include identification markers 135a-135e (generally identification markers 135). Identification marker 135a is attached to rack 105a, identification marker 135b is attached to rack 105b, identification marker 135c is attached to rack 105c, identification marker 135d is attached to rack 105d, and identification marker 135e is attached to rack 105e.

In some embodiments, identification markers can be applied directly to IT components. For example, identification markers 135 can be applied to racks 105 during the manufacturing process. In some embodiments, identification markers 135 can comprise ink, paint or powder coat applied to racks 105. In some embodiments, identification markers can be printed on paper or a label and affixed to the face of an IT component. In some embodiments, identification markers can be applied to servers 110.

Identification markers 135 are merely exemplary. In some embodiments, identification markers can be QR codes or bar codes. In some embodiments, identification markers can include any kind of optical code, such as Codabar, Code 11, EAN-13, EAN-8, MSI, Plessey, PostNet, UPC-A, UPC-E, LOGMARS, PDF417, DataMatrix, or Maxicode optical codes.

Identification markers can represent data. In some QR codes, the arrangement of black modules and white modules can represent an alphanumeric string. In some embodiments, an identification marker can represent information about the IT component to which it is attached. In some embodiments, an identification marker can represent an IT component's serial number or other number assigned by its manufacturer. In some embodiments, an identification marker can represent an IT component identifier assigned by the system owner. In some embodiments, an identification marker can represent additional information about an IT component, such as IT components it contains, its IP address, etc.

Figure 1C:
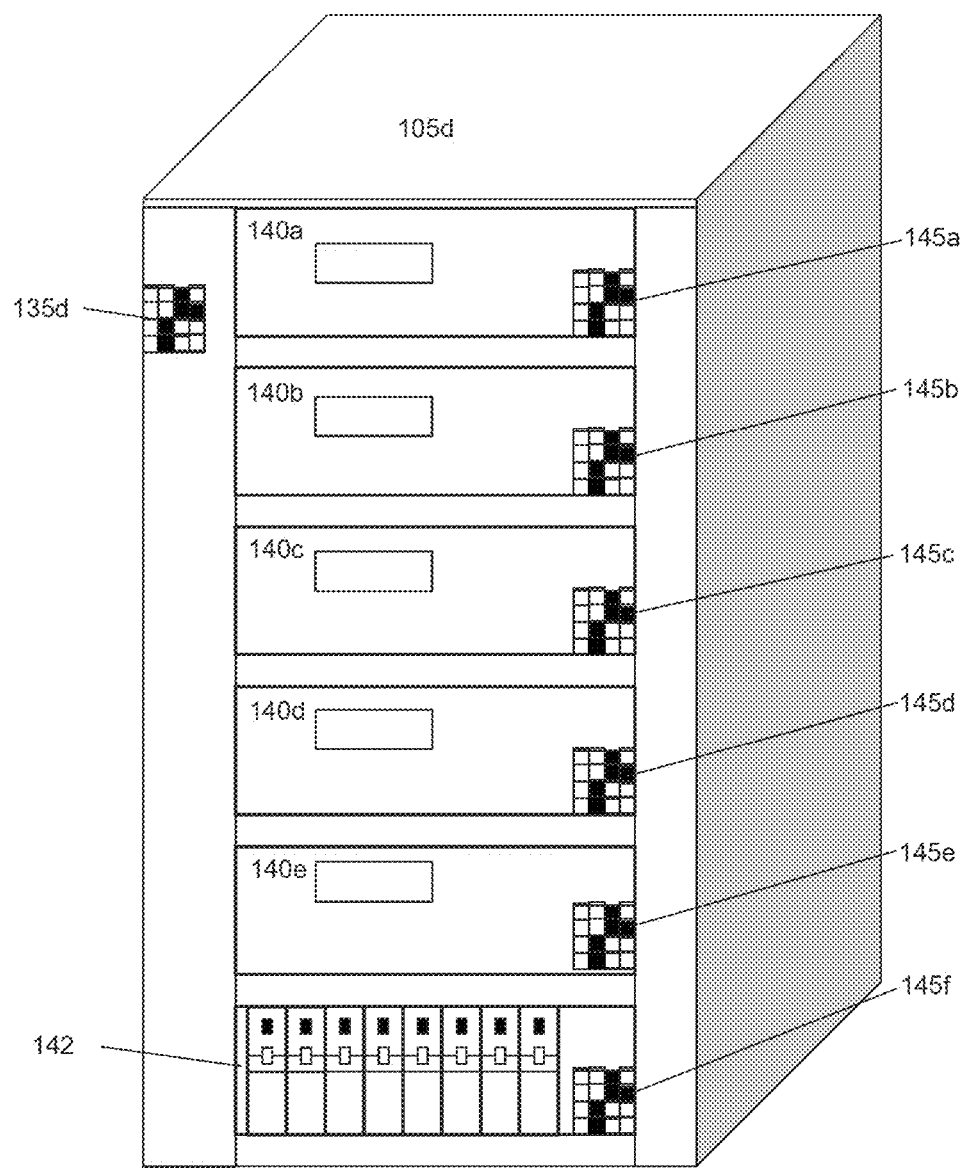
FIG. 1C depicts a rack in a data center.

FIG. 1C depicts rack 105d in data center 100. As illustrated in FIG. 1C, rack 105d includes identification marker 135d. Rack 105d includes servers 140a-140e (collectively servers 140) and disk enclosure 142 (e.g., servers 140 and disk enclosure 142 are installed in rack 105d). Servers 140 and disk enclosure 142 include identification markers 145a-145f (collectively identification markers 145). Identification marker 145a is attached to server 140a, identification marker 145b is attached to server 140b, identification marker 145c is attached to server 140c, identification marker 145d is attached to server 140d, identification marker 145e is attached to server 140e, and identification marker 145f is attached to disk enclosure 142. Disk enclosure 142 can contain disk drives with identification markers attached (not shown).

Figure 2A:
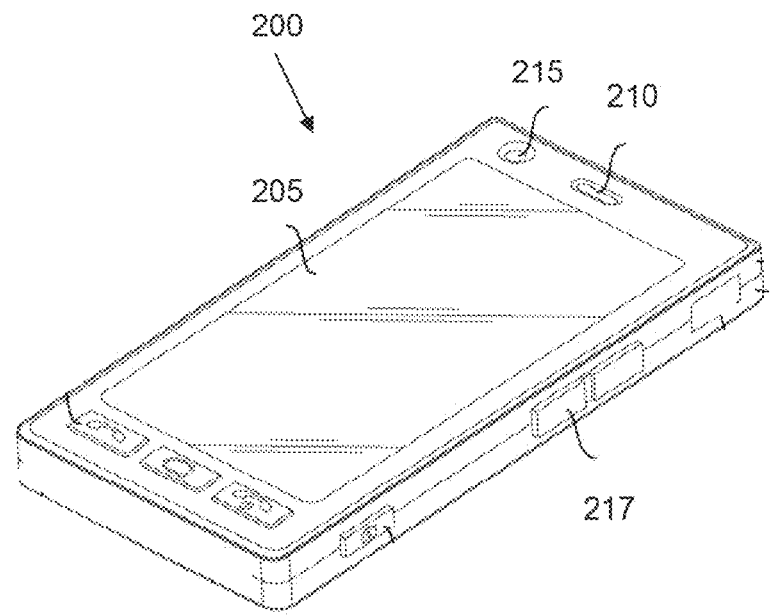
FIG. 2A depicts a front view of a mobile computing device.

FIG. 2A depicts a front view of a mobile computing device 200. As shown in FIG. 2A, mobile computing device 200 can have a bar-type body. In some embodiments, a mobile computing device can be a smartphone, cellular phone, tablet computer, laptop computer, or other computing device that can be brought into a data center. Mobile computing device 200 can include display 205, audio output unit 210, camera 215, and user input unit 217. In some embodiments, display 205 can be touch sensitive (e.g., a user can provide input to mobile computing device by touching display 205).

Figure 2B:
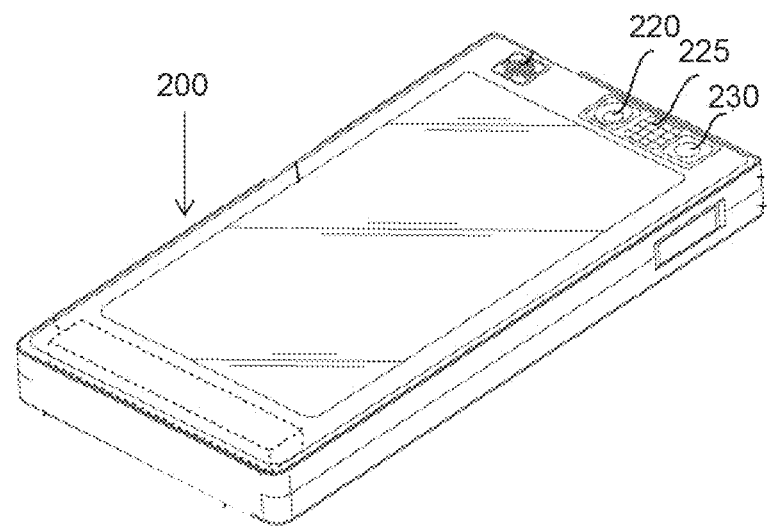
FIG. 2B depicts a back view of a mobile computing device.

FIG. 2B depicts a back view of mobile computing device 200. As shown in FIG. 2B, mobile computing device 200 can include camera 220. Camera 220 can have a photographing direction that is substantially opposite to a photographing direction of camera 215 and can have pixels differing from pixels of camera 215. Mobile computing device 200 can include flash 225 adjacent to the camera 220. Flash 225 can emit light toward a subject in case of photographing the subject using camera 220.

Mobile computing device 200 can include antenna 230 for communication.

Figure 2C:
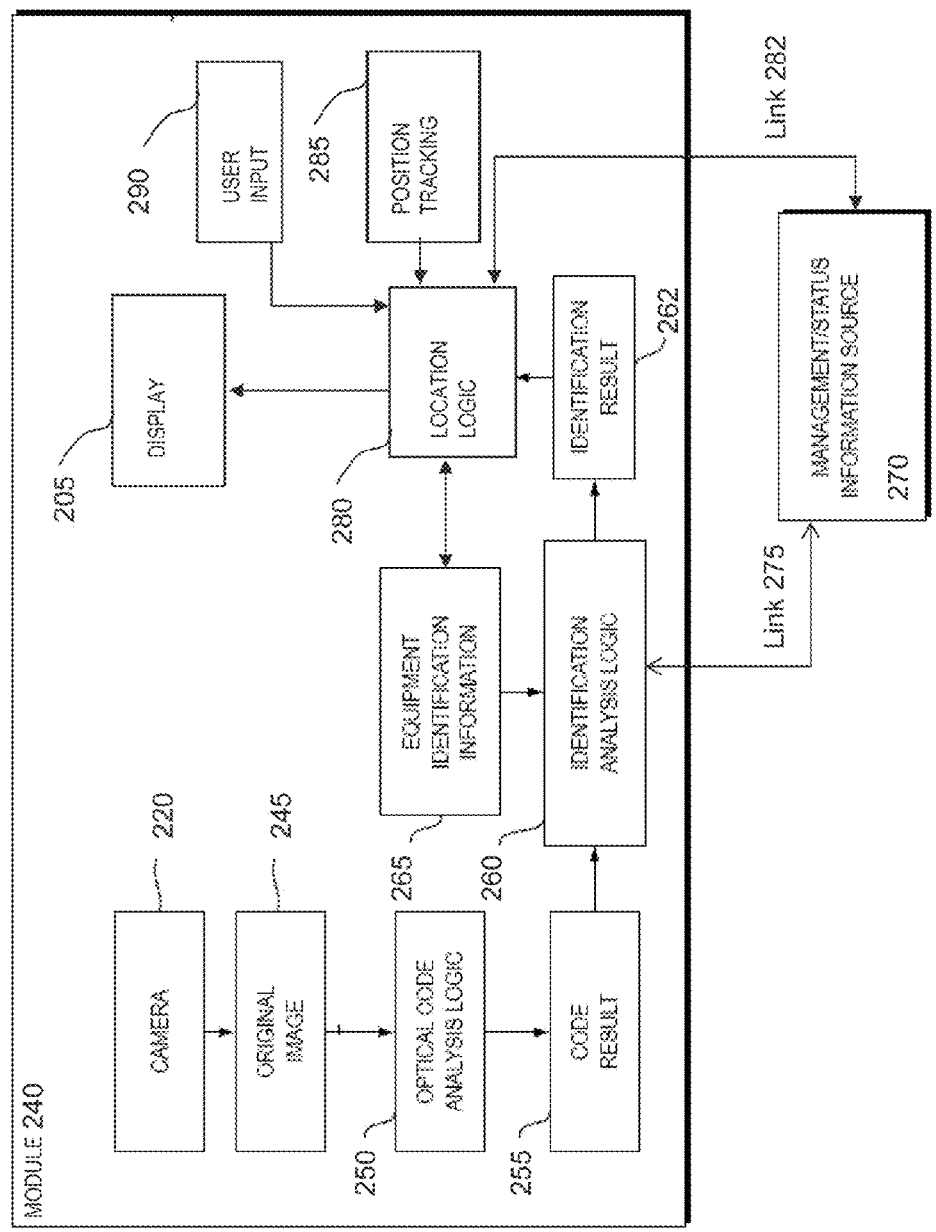
FIG. 2C depicts a block diagram of a data center management module of a mobile computing device.

FIG. 2C depicts a block diagram of a data center management module 240 of mobile computing device 200. Camera 220 can produce original image 245. Optical code analysis logic 250 can include logic that can be used to interpret one or more optical codes in original image 245, to produce code result 255. In some embodiments, code result 255 can include the decoded value or values for each optical code within original image 245 and the location of each optical code within original image 245.

Identification analysis logic 260 can, for example, determine an identification result 262 (e.g., the identity of an IT component) based on code result 255. In some embodiments, for example, code result 255 can be the decoded value of an optical code. Identification analysis logic 260 can, based on the decoded value of the optical code, request an IT component identity from equipment identification information 265 and/or management/status information source 270. For example, if code result 255 includes a serial number of an IT component and equipment identification information 265 includes a database mapping serial numbers of IT components to IT component identities (e.g., IP address, system name, model, manufacturer, and/or other specification data), identification analysis logic 260 can retrieve IT component identities from equipment identification information 265. In the illustrated embodiment, equipment identification information 265 can be stored on mobile computing device 200. As another example, if code result 255 includes a serial number of an IT component and management/status information source 270 includes a database mapping serial numbers of IT components to IT component identities, identification analysis logic 260 can retrieve IT component identities from management/status information source 270. In some embodiments, IT component status information can be retrieved from management/status information source 270. In the illustrated embodiment, management/status information source 270 can be a separate computing device from mobile computing device 200 (e.g., a server). Mobile computing device 200 can communicate with management/status information source 270 via link 275 (e.g., via a WIFI connection over antenna 230).

In some embodiments, a virtual representation of a data center can be stored in equipment identification information 265 of mobile computing device 200. In some embodiments, the virtual data center can be stored on an external server. Location logic 280 can determine the location of an IT component based on identification result 262 (e.g., location logic 280 can determine the location of an IT component based on the virtual representation of a data center). Location logic 280 can receive position tracking 285. In some embodiments, position tracking 285 can be position information from a GPS receiver and can provide the position of mobile computing device 200. In some embodiments, position tracking 285 can be position information from an accelerometer and/or gyroscope. In some embodiments, position tracking 285 can provide the current location of mobile computing device 200 as coordinates (e.g., latitude and longitude). In some embodiments, position tracking 285 can provide the current location of mobile computing device 200 relative to a previous location of mobile computing device 200 (e.g., providing that the mobile computing device has traveled a specific distance in a specific direction).

Location logic 280 can receive user input 290. For example, user input 290 can be the identity of an IT component the user intends to locate. In some embodiments, user input 290 can be an IT component identity. In some embodiments, location logic 280 can, based on user input 290, request an IT component identity from equipment identification information 265 and/or management/status information source 270. Location logic 280 can determine the location of an IT component based on the identity of the IT component (e.g., location logic 280 can determine the location of an IT component based on the virtual representation of a data center).

Location logic 280 can display on display 205 a map of a data center based on the virtual representation of the data center. Location logic 280 can cause indicia of the locations of IT components and/or the mobile computing device 200 to be displayed on the map of the data center.

Link 275 can enable communications between identification analysis logic 275 and external sources, such as management/status information source 270. Link 282 can enable communications between location logic 280 and external sources, such as management/status information source 270. Links 275 and 282 can be one or more TCP/IP lines, which may use a known protocol such as NFS, HTTP, and Windows Networking Links 275 and 282 can be a WIFI or WAN or other wireless connection, or a dedicated physical connection such as a USB or serial connection.

Management/status information source 270 can be, can include, or can be included in a management system for IT components. Management/status information source 270 can support one or more interfaces such as an application programming interface (API), command line interface (CLI), graphical user interface (GUI), or web services.

Virtual Data Center Data

As described above, a virtual data center can be a computer-based model. For example, a virtual data center can be a computer-based model including one or more objects or data structures. In some embodiments, physical items in the data center can be represented by objects (e.g., each rack, server, HVAC, wall, etc. is represented by an object). In some embodiments, items in the data center can be represented by container objects (e.g., instances of a container class). For example, each rack, server, disk enclosure, disk drive, identification marker, HVAC, wall, etc. in the data center can be represented by a container object in the virtual representation of the data center. In some embodiments, each rack, server, HVAC, wall, etc. in the data center is represented by an instance of a class derived from the container class (e.g., rack class, server class, HVAC class, wall class, etc.).

In some embodiments, the virtual data center can be a hierarchy of container objects. For example, a container object can be the child of another container object (its parent) (e.g., to denote the child is contained by the parent). A container object can be a parent of one or more other container objects (its children). A container object can have no parent or children. For example, with reference to FIGS. 1A-1C, data center 100, rack 105d, servers 140, disk enclosure 142, and identification markers 135 and 145 can each be represented by a separate container object. The container object representing data center 100 can be the parent of the container object representing rack 105d to denote rack 105d is contained in data center 100. The container object representing rack 105d can be the parent of the container objects representing servers 140 and disk enclosure 142 to denote that servers 140 and disk enclosure 142 are installed in rack 105d. The container object representing rack 105d can be the parent of the container object representing identification marker 135d.

A container object can have member variables representing information about the item in the data center that the container object represents. The container object can have member variables that store the manufacturer, model, serial number, system identification, etc. for the item that the container object represents. The container object can have member variables that store position data for the item that the container object represents. In some embodiments, position data can include coordinates (e.g., (x,y,z)) in 3D space of the item that the container object represents. The coordinates can be relative to a coordinate system based on the data center (e.g., where in the data center the item is located). The coordinates can be relative to a coordinate system based on a parent object (e.g., where in a rack a server is located or where on the face of a server an identification marker is located). In some embodiments, position data can include the dimensions or size for the item that the container object represents (e.g., width, height, and depth). In some embodiments, position data can include a three dimensional vector indicating the direction in which the item that the container object represents is facing.

Locating an it Component in a Data Center

Figure 3:
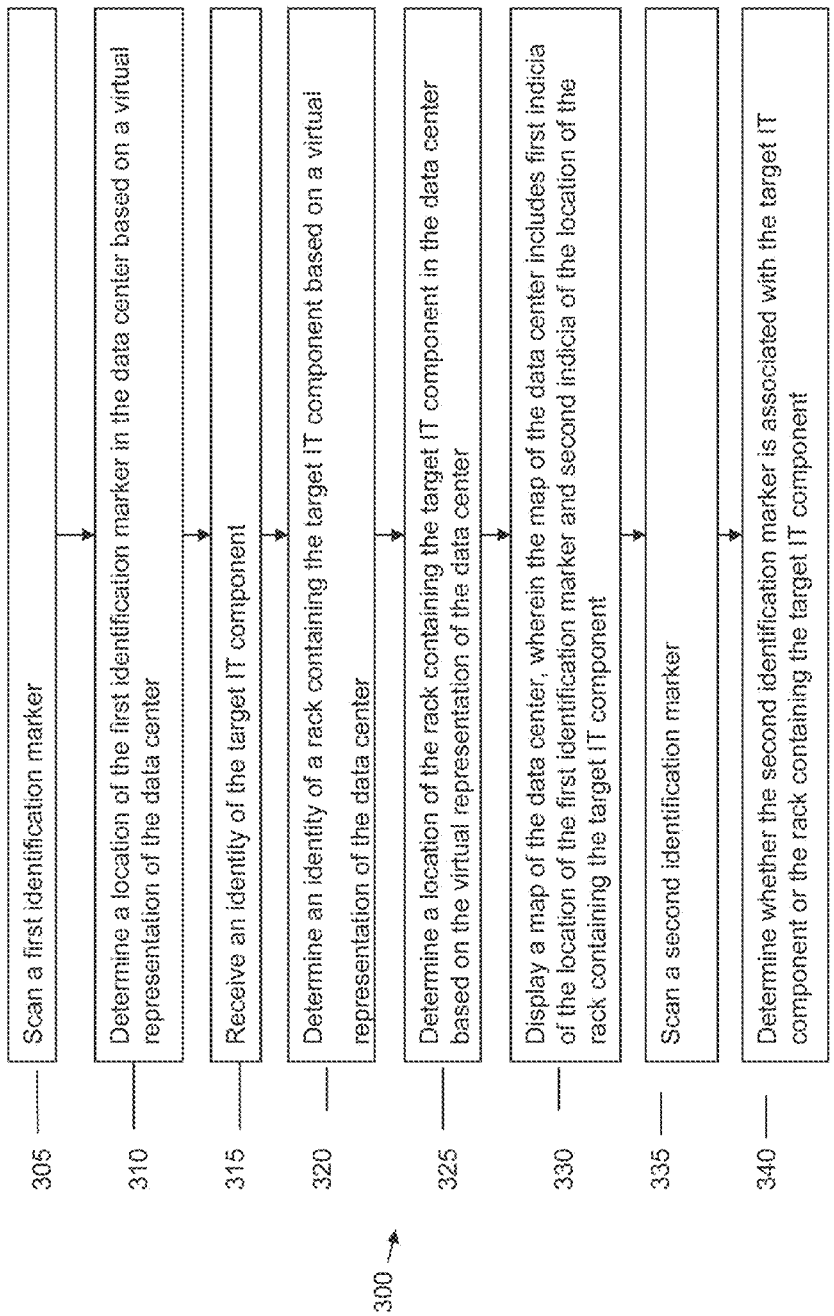
FIG. 3 depicts a flow chart for a method of locating an IT component in a data center.
Figure 4A:
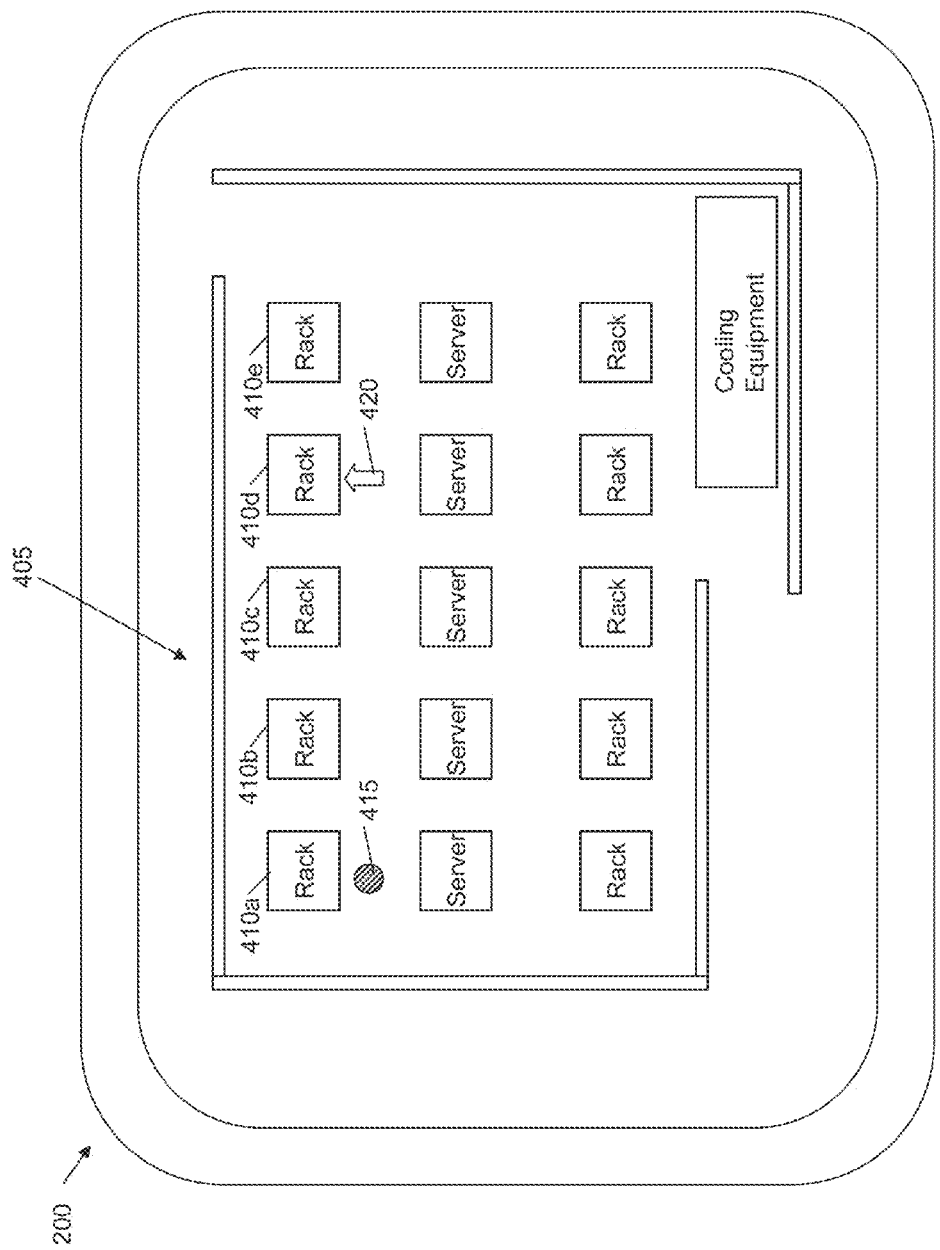
FIGS. 4A-4B depict a mobile computing device locating a server in a data center.
Figure 4B:
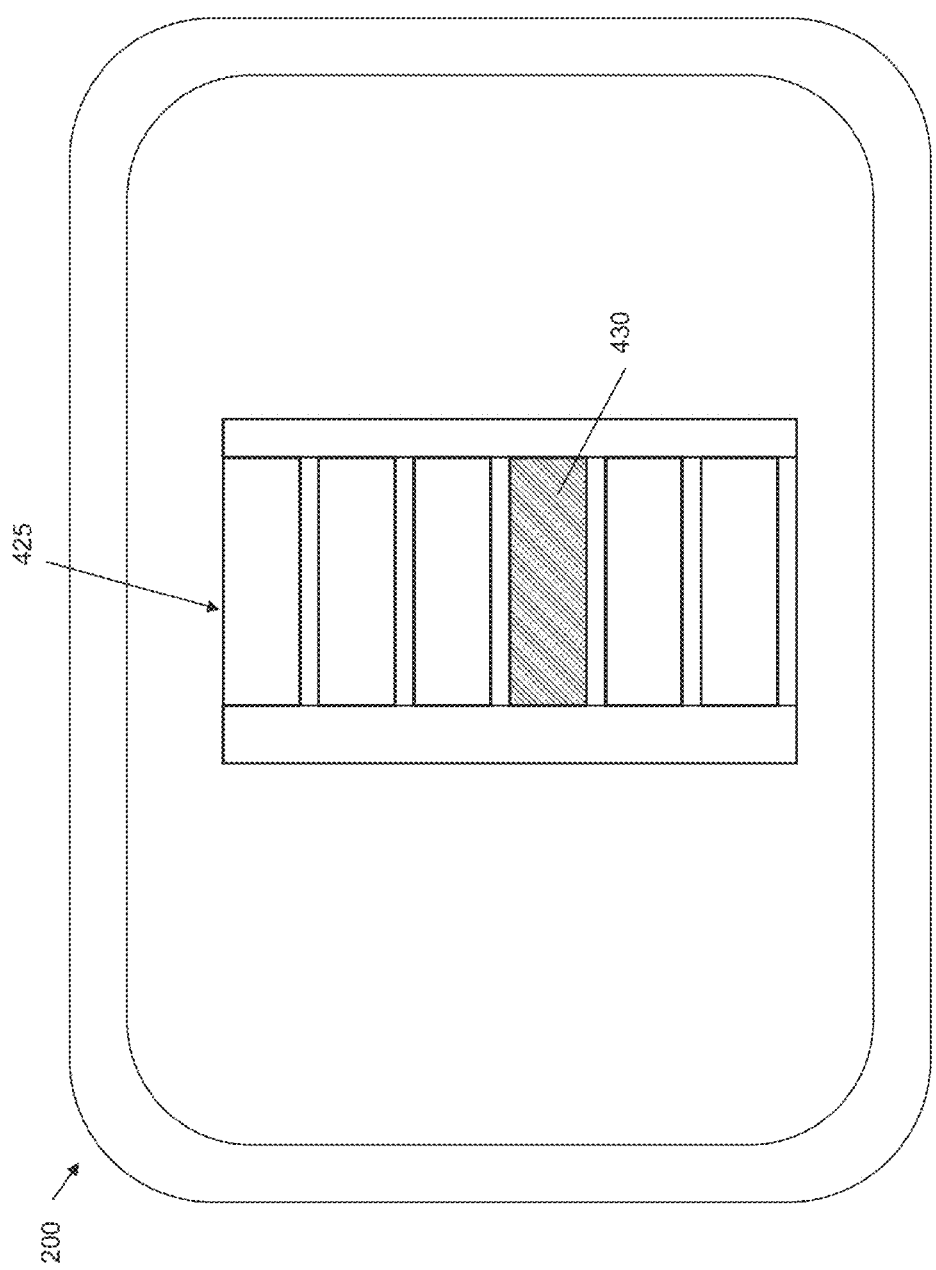

Mobile computing device 200 can locate an IT component in a data center (e.g., data center 100) based on a virtual representation of the data center. FIG. 3 depicts flow chart 300 for a method of locating an IT component in a data center. FIGS. 4A-4B depict a mobile computing device locating server 140d in data center 100. In the illustrated example, mobile computing device 200 locates server 140d in data center 100 in relation to the current position of mobile computing device 200 in front of rack 105a. While the illustrated embodiment involves locating server 140d in data center 100 in relation to another IT component, it should be appreciated that identification markers can be affixed to any item in a data center (e.g., a wall, post, door, etc.). In some embodiments, an identification marker can be represented by a container object that contains position data for the identification marker.

In some embodiments, mobile computing device 200 can scan a first identification marker (step 305). For example, mobile computing device 200 can use camera 220 to acquire an image (e.g., original image 245) of rack 105a, including identification marker 135a. In some embodiments, mobile computing device 200 can use camera 220 to acquire an image in response to receiving a signal from user input unit 217. Mobile computing device 200 can use optical code analysis logic 250 of data center management module 240 to locate in original image 245 identification marker 135a on rack 105a.

In some embodiments, mobile computing device 200 can determine a location of the first identification marker in the data center based on a virtual representation of the data center (step 310). For example, mobile computing device 200 can use optical code analysis logic 250 of data center management module 240 to generate code result 255 by processing the image of identification marker 135a on rack 105a. In some embodiments, code result 255 can be an identity of rack 105a (e.g., the serial number of rack 105a). In some embodiments, code result 255 can be used to determine the identity of rack 105a. For example identification analysis logic 260 can use code result 255 to query equipment identification information 265 and/or management/status information source 270 for the identity of rack 105a. Location logic 280 can determine the location of rack 105a based on identification result 262 (e.g., location logic 280 can determine the location of rack 105a based on the virtual representation of data center 100). For example, location logic 280 can retrieve position data from a container object that represents rack 105a.

In some embodiments, mobile computing device 200 can receive an identity of the target IT component (step 315). For example, mobile computing device 200 can receive the identity of server 140d via user input 290. User input 290 can include the identity of server 140d (e.g., the serial number of server 140d). In some embodiments, location logic 280 can, based on user input 290, request the identity of server 140d from equipment identification information 265 and/or management/status information source 270.

In some embodiments, mobile computing device 200 can determine an identity of a rack containing the target IT component based on a virtual representation of the data center (step 320). For example, location logic 280 can determine that rack 105d contains server 140d. In some embodiments, location logic 280 can determine that rack 105d contains server 140d based on the container object that represents server 140d being a child of the container object that represents rack 105d.

In some embodiments, mobile computing device 200 can determine a location of the rack containing the target IT component in the data center based on the virtual representation of the data center (step 325). For example, location logic 280 can retrieve position data from a container object that represents rack 105d.

In some embodiments, mobile computing device 200 can display a map of the data center, wherein the map of the data center includes first indicia of the location of the first identification marker and second indicia of the location of the rack containing the target IT component (step 330). For example, location logic 280 can display on display 205 a map of data center 100 based on the virtual representation of data center 100. With reference to FIG. 4A, mobile computing device 200 can display map 405 of data center 100 based on a virtual representation of data center 100. Map 405 includes graphics 410a-410e representing racks 105a-105e, respectively. Map 405 includes indicia 415 showing the location of rack 105a and indicia 420 showing the location of rack 105d. Beneficially, map 405 can direct a user from rack 105a (e.g., the user's current location) to rack 105d (e.g., the rack containing server 140d, which the user wishes to locate).

In some embodiments, mobile computing device 200 can scan a second identification marker (step 335). For example, mobile computing device 200 can use camera 220 to acquire an image (e.g., original image 245) of an identification marker as described above. Beneficially, a user can scan identification codes on IT components in data center 100 while following map 405 to determine whether he has arrived at server 140d. As described below, the technology can alert the user when he scans an identification marker associated with rack 105d or server 140d.

In some embodiments, mobile computing device 200 can determine whether the second identification marker is associated with the target IT component or the rack containing the target IT component (step 340). For example, mobile computing device 200 can use optical code analysis logic 250 of data center management module 240 to generate code result 255 by processing the image of identification marker scanned in step 335. Code result 255 can be used to determine the identity of the IT component to which the identification marker is attached.

In some embodiments, if the scanned identification marker is associated with server 140d (e.g., the scanned identification marker is identification marker 145d), mobile computing 200 device can display indicia representing that server 140d is located (e.g., by displaying a message indicating the target server is located). In some embodiments, mobile computing device can display a representation of rack 105d including server 140d (e.g., as shown in FIG. 4B).

In some embodiments, if the scanned identification marker is associated with rack 105d, (e.g., the scanned identification marker is identification marker 135d), mobile computing device can display a representation of rack 105d. With reference to FIG. 4B, mobile computing device 200 can display graphic 425, which is a representation of rack 105d. Graphic 425 includes graphic 430, which represents server 140d. As illustrated, graphic 430 is shown as installed in graphic 425 to reflect that server 140d is installed in rack 105d.

In some embodiments, mobile computing device 200 can scan an identification marker on a server in rack 105d. If the scanned identification marker is associated with server 140d, mobile computing device 200 can display indicia representing that server 145d is located (e.g., by causing graphic 430 to blink).

The above-described techniques can be implemented in digital electronic circuitry, or in computer hardware, firmware, software, or in combinations of them. The implementation can be as a computer program product, i.e., a computer program tangibly embodied in a non-transitory information carrier, e.g., in a machine-readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the technology by operating on input data and generating output. Method steps can also be performed by, and apparatus can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer also includes, or be operatively coupled to receive data from or transfer data to, or both, one or more mass storage devices for storing data, e.g., magnetic, magneto-optical disks, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the above described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact through a communication network. The relationship of client and server arises by virtue of computer programs running on the respective computers and having a client-server relationship to each other.

The technology has been described in terms of particular embodiments. The alternatives described herein are examples for illustration only and not to limit the alternatives in any way. The steps of the technology can be performed in a different order and still achieve desirable results. Other embodiments are within the scope of the following claims.

What is claimed is:

1. A method executed on a mobile computing device for locating a target IT component in a data center comprising:
   scanning, by the mobile computing device, a first identification marker;
   determining, by the mobile computing device, a location of the first identification marker in the data center based on a virtual representation of the data center;
   receiving, by the mobile computing device, an identity of the target IT component;
   determining, by the mobile computing device, an identity of a rack containing the target IT component based on a virtual representation of the data center;
   determining, by the mobile computing device, a location of the rack containing the target IT component in the data center based on the virtual representation of the data center;
   displaying, by the mobile computing device, a map of the data center, wherein the map of the data center includes first indicia of the location of the first identification marker and second indicia of the location of the rack containing the target IT component;
   scanning, by the mobile computing device, a second identification marker;
   determining, by the mobile computing device, whether the second identification marker is associated with the target IT component or the rack containing the target IT component;
   when the second identification marker is associated with the rack containing the target IT component:
      displaying, by the mobile computing device, a representation of the rack containing the target IT component;
      scanning, by the mobile computing device, a third identification marker; and
      when the third identification marker is associated with the target IT component, displaying, by the mobile computing device, third indicia representing that the target IT component is located.

2. The method of claim 1, further comprising:
   when the second identification marker is associated with the target IT component, displaying third indicia representing that the target IT component is located.

3. The method of claim 2, wherein the third indicia representing that the target IT component is located comprises a representation of the target IT component in the rack containing the target IT component.

4. The method of claim 1, wherein the target IT component is a server.

5. The method of claim 1, wherein the first identification marker and the second identification marker are QR codes.

6. The method of claim 1, wherein the second indicia of the location of the rack containing the target IT component comprises a representation of the rack containing the target IT component.

7. The method of claim 1, further comprising:
   tracking, by the mobile computing device, a location of the mobile computing device in the data center; and
   displaying, by the mobile computing device, the first indicia at the location of the mobile computing device.

8. A computer program product, tangibly embodied in a non-transitory computer readable storage medium, comprising instructions being operable to cause a mobile computing device to:
   scan a first identification marker;
   determine a location of the first identification marker in the data center based on a virtual representation of the data center;
   receive an identity of the target IT component;
   determine an identity of a rack containing the target IT component based on a virtual representation of the data center;
   determine a location of the rack containing the target IT component in the data center based on the virtual representation of the data center;

display a map of the data center, wherein the map of the data center includes first indicia of the location of the first identification marker and second indicia of the location of the rack containing the target IT component;

scan a second identification marker;

determine whether the second identification marker is associated with the target IT component or the rack containing the target IT component;

when the second identification marker is associated with the rack containing the target IT component:

display a representation of the rack containing the target IT component;

scan a third identification marker; and when the third identification marker is associated with the target IT component, display third indicia representing that the target IT component is located.

9. The computer program product of claim 8, further comprising instructions being operable to cause a mobile computing device to:

when the second identification marker is associated with the target IT component, display third indicia representing that the target IT component is located.

10. The computer program product of claim 9, wherein the third indicia representing that the target IT component is located comprises a representation of the target IT component in the rack containing the target IT component.

11. The computer program product of claim 8, wherein the target IT component is a server.

12. The computer program product of claim 8, wherein the first identification marker and the second identification marker are QR codes.

13. The computer program product of claim 8, wherein the second indicia of the location of the rack containing the target IT component comprises a representation of the rack containing the target IT component.

14. The computer program product of claim 8, further comprising instructions being operable to cause a mobile computing device to:

track a location of the mobile computing device in the data center; and display the first indicia at the location of the mobile computing device.

15. A mobile computing device comprising:

a scanner;

a display; and a data center management module configured to:

scan a first identification marker;

determine a location of the first identification marker in the data center based on a virtual representation of the data center;

receive an identity of the target IT component;

determine an identity of a rack containing the target IT component based on a virtual representation of the data center;

determine a location of the rack containing the target IT component in the data center based on the virtual representation of the data center;

display, on the display, a map of the data center, wherein the map of the data center includes first indicia of the location of the first identification marker and second indicia of the location of the rack containing the target IT component;

scan a second identification marker;

determine whether the second identification marker is associated with the target IT component or the rack containing the target IT component;

when the second identification marker is associated with the rack containing the target IT component:

display, on the display, a representation of the rack containing the target IT component;

scan a third identification marker and;

when the third identification marker is associated with the target IT component, display third indicia representing the target IT component is located.

16. The mobile computing device of claim 15, wherein the data center management module is further configured to:

when the second identification marker is associated with the target IT component, display, on the display, third indicia representing the target IT component is located.

17. The mobile computing device of claim 15, wherein the data center management module is further configured to:

track a location of the mobile computing device in the data center; and display, on the display, the first indicia at the location of the mobile computing device.

* * * * *